United States Patent [19]

Tarry

[11] Patent Number: 5,032,553

[45] Date of Patent: Jul. 16, 1991

[54] HIGH DENSITY HIGH STRENGTH ALPHA SIALON BASED ARTICLE AND PROCESS FOR PRODUCING SAME

[75] Inventor: Christopher A. Tarry, Sayre, Pa.

[73] Assignee: GTE Products Corporation, Stamford, Conn.

[21] Appl. No.: 624,501

[22] Filed: Dec. 7, 1990

Related U.S. Application Data

[63] Continuation of Ser. No. 449,067, Dec. 18, 1989, abandoned, which is a continuation of Ser. No. 197,498, May 23, 1988, abandoned, which is a continuation-in-part of Ser. No. 10,101, Jan. 30, 1987, abandoned.

[51] Int. Cl.$^5$ .............................................. C04B 35/58
[52] U.S. Cl. ........................................ 501/97; 501/98; 264/65; 264/66
[58] Field of Search ...................... 501/97, 98; 264/65, 264/66

[56] References Cited

U.S. PATENT DOCUMENTS 4,066,468  1/1978  Kamigaito et al. .................... 501/98

FOREIGN PATENT DOCUMENTS 7003769  1/1982  Japan ..................................... 501/98

OTHER PUBLICATIONS

Kingery, W. O. *Introduction to Ceramics*, John Wiley & Sons, New York, 1960, pp. 46-47.

*Primary Examiner*—Theodore Morris
*Assistant Examiner*—David M. Brunsman
*Attorney, Agent, or Firm*—Robert E. Walter

[57] ABSTRACT

A high density high strength ceramic article is disclosed having from about 70% to about 100% of its crystalline phases as alpha sialon, having less than about 20% by weight of its crystalline phases as beta sialon, having a density of greater than about 94% of the theoretical density, and having a flexural strength of greater than about 70 kpsi at about room temperature, a Knoop hardness of greater than about 14 GPa, and a Rockwell A hardness of greater than about 94. The process for producing the article is disclosed. The process involves forming a powder mixture consisting essentially of in percent by weight from about 48 to about 88 silicon nitride, from about 8 to about 30 aluminum nitride, from about 2 to about 16 of an oxygen containing compound of an element selected from the group consisting of yttrium, lithium, magnesium, calcium, scandium, cerium, rare earths, and combinations thereof, and from about 2 to about 12 of oxygen containing compounds of one or more metals as additives to aid densification, forming a green article from the mixture, and densifying the green article by one or more methods selected from the group consisting of sintering, sintering followed by hot isostatic pressing, and encapsulated hot isostatic pressing, at a temperature of from about 1600° C. to about 2000° C.

2 Claims, No Drawings

HIGH DENSITY HIGH STRENGTH ALPHA SIALON BASED ARTICLE AND PROCESS FOR PRODUCING SAME

This is a continuation of copending application Ser. No. 07/449,067, filed on Dec. 18, 1989, entitled "High Density High Strength Alpha Sialon Based Article and Process for Producing Same" now abandoned, which is a continuation of Ser. No. 07/197,498, filed on May 23, 1988, now abandoned, which application is a continuation-in-part of application Ser. No. 010,101 filed Jan. 30, 1987 and entitled, "High Density High Strength Alpha Sialon Based Article And Process For Producing Same".

This invention relates to dense high strength ceramic articles containing silicon aluminum oxynitride having the crystal structure of a alpha silicon nitride but of expanded cell dimensions hereinafter referred to as alpha sialon, and to the process for producing these articles.

BACKGROUND OF THE INVENTION

Ceramic materials based on silicon nitride and silicon aluminum oxynitrides have been the subject of much research over the last decade due to their engineering potential. Materials have been developed with high strength, creep resistance, hardness, resistance to chemical attack, and with retention of these properties at high temperatures. Due to their high hardness, machining of these ceramic materials once densified involves costly, difficult diamond machining. Hence much research has also been conducted into near-net shape forming and densification. For complex shapes, this does not permit hot pressing. Instead, sintering and hot isostatic pressing technologies have been developed. Also, commercially, sintering and hot isostatic pressing methods of densification are to be preferred over hot pressing for mass production since for hot pressing the productivity is poor and the production cost high.

This invention relates to one of the silicon aluminum oxynitrides (sialons) which has the alpha silicon nitride crystal structure but of expanded cell dimensions commonly known as alpha sialon. This material has been known for a number of years as a potentially useful engineering ceramic. Literature reference report full densification of these materials by hot pressing only, along with attempts at full densification by sintering without the application of pressure which yielded products of low strength. One such reference is an article entitled "The Strength of Alpha Sialon Ceramics", Journal of Materials Science, 15 (1980).

There are no references to the use of densification additives for these materials.

There is little or no evidence of high densities, that is, near theoretical densities or of high strengths being sustained in production artifacts having greater than about 70 weight percent of crystalline phases as alpha sialon. Little attention has been given to the usefulness of such products as enginering ceramics compared to the beta sialons or to manufacturing methods for producing such products which allow commercial mass production or the densification of complex shapes, that is, which avoid hot pressing. However, prior to this invention beta sialons and mixtures of alpha and beta sialons having less than about 70 weight percent as alpha sialon have found application as metal cutting tools as described in U.S. Pat. Nos. 4,323,323 and 4,563,433 and have been commercially manufactured for this use.

SUMMARY OF THE INVENTION

In accordance with one aspect of this invention there is provided a ceramic article having from about 70% to about 100% by weight of its crystalline phases as alpha sialon, having less than about 20% by weight of its crystalline phases as beta sialon, having a density of greater than about 94% of the theoretical density, and having a flexural strength of greater than about 70 kpsi at room temperature, a Knoop hardness of greater than about 14 GPa, and a Rockwell A hardness of greater than about 94.

In accordance with another aspect of this invention, there is provided a process for producing the article. The process involves forming a powder mixture consisting essentially of in percent by weight from about 48 to about 88 silicon nitride, from about 8 to about 30 aluminum nitride, from about 2 to about 16 of an oxygen containing compound of an element selected from the group consisting of yttrium, lithium, magnesium, calcium, scandium, cerium, rare earths, and combinations thereof, and from about 2 to about 12 of oxygen containing compounds of one or more metals as additives to aid densification, forming a green article from the mixture, and densifying the green article by one or more methods selected from the group consisting of sintering, sintering followed by hot isostatic pressing, and encapsulated hot isostatic pressing, at a temperature of from about 1600° C. to about 2000° C.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The dense ceramic article of this invention has from about 70% to about 100% by weight of its crystalline phases as alpha sialon according to the general formula $M_x(Si, Al)_{12}(O,N)_{16}$ wherein $x \leq 2$ and M is a metal cation selected from the group consisting of yttrium, lithium, magnesium, calcium, scandiium, cerium, rare earths and combinations thereof with yttrium being a preferred metal cation.

In addition to the alpha sialon crystalline phase, there can be other crystalline phases but less than about 20% by weight of the crystalline phases are beta sialon. In addition to the crystalline phases, there can be present a residual glassy phase making up from about 0% to about 20% by weight of the article.

U.S. Pat. No. 4,563,433 teaches a mixture of alpha and beta sialon wherein the alpha sialon makes up from about 10% to about 70% of the material and the beta sialon makes up from about 20% to about 90% by weight of the material. The present invention teaches an article made up of primarily alpha sialon with less than about 20% by weight of the crystalline phases as beta sialon.

In this invention, the terms "silicon aluminum oxynitride" and "sialon" mean not only ceramic materials comprising silicon, aluminum, oxygen, and nitrogen, but also materials which include additionally other cations such as yttrium, lithium, magnesium, calcium, scandium, cerium, and rare earths.

The ceramic articles of this invention are of high density, that is, they have a density of greater than about 94% of the theoretical density, and most preferably greater than about 98% of the theoretical density.

The above described ceramic articles have high hardness. Typical hardness values are greater than about 14 GPa by Knoop technique or greater than about 94 by Rockwell A.

The above described ceramic articles have high strength, that is, greater than about 70 kpsi room temperature, 4 point transverse rupture strength.

The process for making the above described ceramic article of this invention having the above described properties involves first forming a powder mixture consisting essentially of in percent by weight from about 48 to about 88 silicon nitride, from about 8 to about 30 aluminum nitride, from about 2 to about 16 of an oxygen containing compound containing an element selected from the group consisting of yttrium, lithium, magnesium, calcium, scandium, cerium, rare earths, and combinations thereof, and from about 2 to about 12 of oxygen containing compounds of one or more metals as additives to aid in densification. Examples of such metals are silicon, aluminum, titanium, zirconium, hafnium, vanadium, niobium, tantalum, yttrium, lithium, magnesium, calcium, scandium, cerium, or any rare earth element, but not restricted to these examples.

The term "oxygen containing compound" includes the oxide of the element or an oxygen containing compound of the element which is capable of forming the oxide at the sintering temperature or lower temperature.

The nitride components of the powder mixture have an associated surface oxide layer which must be taken into account. For the purposes of this invention, these oxides are considered to be densifying additives and are controlled appropriately. The weight percent of nitrides for the powder mixture are thus the weights of the pure nitrides required without associated oxygen.

The amounts of oxide sintering aids and aluminum nitride used determine phase relations in these products, that is, the amount of alpha sialon phase, and other crystalline phases. To form products with a high percent of alpha sialon phase, it is necessary to increase the nitride and reduce oxide addition. Some oxide sintering aid is however necessary for densification, hence it is required to balance the nitride and oxide additives to achieve the desired phases in the final product as well as to achieve densification.

To form products with a high percent of alpha sialon phase, it is preferable to use silicon nitride with a low oxygen content.

The powder mixture can be formed by any milling or mixing technique.

The desired product shape is then produced by any of the standard ceramic forming techniques, such as die pressing, isostatic pressing, extrusion, injection molding, or slip casting, followed by burning out or removal of organic binders used in shape forming. Densification of the preform or green article is accomplished at a temperature of from about 1600° C. to about 2000° C., and preferably at from about 1800° C. to about 1900° C. by either sintering, sintering followed by hot isostatic pressing, in a nonoxidizing atmosphere such as nitrogen, or encapsulated hot isostatic pressing in an inert gas using glass ampoule technique for simple shapes and glass frit technique for more complex shapes.

To more fully illustrate this invention, the following non-limiting examples are presented. All percents are by weight unless otherwise stated.

The following examples make use of yttrium as the metal cation occupying the interstices of the alpha sialon network giving valency compensation, and makes use of silicon dioxide, and aluminum oxide as densifying aids. Other oxygen containing compounds can be used as densifications aids as discussed previously. For the yttrium alpha sialons the solid solubility range has been shown by Grand et al to extend along the tie line $Si_3N_4$-$(0.1Y_2O_3:0.9AlN)$, and was further shown to be limited to between the following compositions by Huang et al:

$$Y_{0.33}Si_{10.5}Al_{1.5}O_{0.}N_{15.5}$$

and, $$Y_{0.67}Si_9Al_3ON_{15}$$

Dense materials with greater than about 70 weight percent of their crystalline phases as alpha sialon corresponding to the two ends of this solubility range using small amounts of densification aids are manufactured as follows:

All powders used in this example are milled to less than about 10 microns maximum particle size, less than 2 microns mean particle size unless supplied finer than this. The powder mixtures are formed by either dry ball milling, vibration energy milling, or by agitator ball milling, either dry, or wet in 2propanol or in n-hexane. All milling is done using silicon nitride milling media in plastic containers. The powder mixtures are then dried and screened and then either mixed with a binder and die pressed, dry isopressed, or mixed with wax and extruded, followed by dewaxing to remove the binders.

Densification is achieved by one of the following as indicated in the Tables that follow:

SINT - Sintering under overpressure of nitrogen

SHIP - Sintering under overpressure of nitrogen followed by containerless hot isostatic pressing under nitrogen to 29 kpsi CHIP - Glass encapsulation followed by hot isostatic pressing using nitrogen or agron to 29 kspi To characterize the crystalline phases of this invention, the x-ray diffraction analysis technique described in Technical Report Number SR-72-98, Sept. 5, 1972 by the Scientific Research Staff of the Ford Motor Company was used.

In Table 1, XRD was performed on the actual pieces used for toughness and hardness analyses.

In Table 2, XRD was performed on blocks of material densified under the same conditions as the actual transverse rupture strength bars made from the exact same lot of powder to give a larger area for analyses.

Table 1 shows increase in hardness over prior art and increasing hardness with increasing weight percent alpha sialon phase.

The following compositions are used in Table 1.

| # | % Si$_3$N$_4$ | % AlN | % Y$_2$O$_3$ | % SiO$_2$ | % Al$_2$O$_3$ | *Rule of Mixtures Density g/cc | Method of Densification |
|---|---|---|---|---|---|---|---|
| Prior Art | | | | | | | |
| A | 87.0 | | 6.0 | 5.0 | 2.0 | 3.231 | SHIP 1800° C. |
| B | 76.8 | 4.5 | 7.0 | 4.4 | 7.3 | 3.287 | SHIP 1700° C. |
| C | 75.6 | 7.6 | 6.6 | 4.4 | 5.8 | 3.274 | SHIP 1700° C. |
| Outside this Invention | | | | | | | |
| D | 78.3 | 9.1 | 5.4 | 4.5 | 2.7 | 3.239 | SHIP 1800° C. |
| E | 76.6 | 10.9 | 5.3 | 4.4 | 2.8 | 3.241 | SHIP 1800° C. |
| F | 74.8 | 12.8 | 5.2 | 4.3 | 3.0 | 3.240 | SHIP 1800° C. |
| G | 73.1 | 14.6 | 5.0 | 4.2 | 3.1 | 3.244 | SHIP 1800° C. |
| This Invention | | | | | | | |
| H | 71.3 | 16.4 | 4.9 | 4.1 | 3.3 | 3.246 | SHIP 1800° C. |
| I | 74.1 | 14.2 | 5.7 | 4.6 | 1.4 | 3.238 | SHIP 1800° C. |
| J | 76.8 | 12.9 | 6.0 | 3.2 | 1.1 | 3.248 | CHIP 1800° C. |
| K | 64.3 | 18.3 | 11.6 | 4.0 | 1.8 | 3.321 | SHIP 1800° C. |

TABLE 1

| # | Densified Resultant Density g/cc | Crystalline Phases Detected by XRD % α sialon | Crystalline Phases Detected by XRD % β sialon | % other phases | Indentation Fracture Toughness MPa m$^{-2}$ | Knoop Hardness GPa | Rockwell A Hardness |
|---|---|---|---|---|---|---|---|
| A | 3.255 | | 100 | | 3.7 | 13.2 | 92.7 |
| B | 3.253 | | 100 | | 3.8 | 13.7 | 93.0 |
| C | 3.251 | 14 | 80 | 6 | 3.6 | 14.3 | 93.6 |
| D | 3.247 | 46 | 54 | | 3.8 | 14.9 | 94.2 |
| E | 3.243 | 60 | 40 | | 3.7 | 15.1 | 94.6 |
| F | 3.244 | 71 | 29 | | 3.7 | 15.2 | 94.9 |
| G | 3.249 | 74 | 23 | 4 | 3.4 | 15.3 | 95.0 |
| H | 3.252 | 81 | 14 | 5 | 3.2 | 15.9 | 95.2 |
| I | 3.251 | 85 | 15 | | 3.4 | 16.4 | 95.4 |
| J | 3.258 | 95 | 5 | | | 15.5 | 95.4 |
| K | 3.335 | 97 | | 3 | 2.8 | 15.0 | 94.8 |

The following compositions are used in Table 2.

| # | % Si$_3$N$_4$ | % AlN | % Y$_2$O$_3$ | % SiO$_2$ | % Al$_2$O$_3$ | *Rule of Mixtures Density g/cc | Method of Densification |
|---|---|---|---|---|---|---|---|
| Prior Art | | | | | | | |
| L | 87.5 | | 6.0 | 4.5 | 2.0 | 3.235 | SINT 1900° C. |
| M | 80.6 | 3.8 | 6.0 | 4.1 | 5.5 | 3.264 | SINT 1800° C. |
| N | 76.6 | 7.7 | 6.0 | 3.9 | 5.8 | 3.270 | SINT 1800° C. |
| This Invention | | | | | | | |
| O | 72.7 | 14.5 | 6.0 | 3.7 | 3.1 | 3.259 | SHIP 1800° C. |
| P | 70.9 | 16.3 | 6.0 | 3.6 | 3.2 | 3.262 | SHIP 1800° C. |
| Q | 76.8 | 11.1 | 6.0 | 3.2 | 2.9 | 3.258 | SHIP 1850° C. |
| R | 74.9 | 12.9 | 6.0 | 3.1 | 3.1 | 3.262 | SHIP 1850° C. |
| S | 73.0 | 14.8 | 6.0 | 3.0 | 3.2 | 3.265 | SHIP 1850° C. |
| T | 76.8 | 11.1 | 6.0 | 3.2 | 2.9 | 3.258 | SINT 1900° C. |
| U | 74.9 | 12.9 | 6.0 | 3.1 | 3.1 | 3.262 | SINT 1900° C. |
| V | 73.0 | 14.8 | 6.0 | 3.0 | 3.2 | 3.265 | SINT 1900° C. |
| W | 61.8 | 22.2 | 11.0 | 3.2 | 1.8 | 3.322 | SINT 1900° C. |

Table 2 shows typical strengths of the materials of this invention having lower strengths than prior art beta sialons but higher strengths than prior art alpha sialons.

TABLE 2

| # | Densified Resultant Density g/cc | Crystalline Phases Detected by XRD % α sialon | Crystalline Phases Detected by XRD % β sialon | % other phases | Transverse Rupture Strength kpsi (MPa) | Standard Deviation Strength kpsi (MPa) | Number of Bars Broken |
|---|---|---|---|---|---|---|---|
| L | 3.257 | | 100 | | 140.9 (971.5) | 6.7 (46.2) | 30 |

TABLE 2-continued

| # | Densified Resultant Density g/cc | Crystalline Phases Detected by XRD | | | Transverse Rupture Strength kpsi (MPa) | Standard Deviation Strength kpsi (MPa) | Number of Bars Broken |
|---|---|---|---|---|---|---|---|
| | | % α sialon | % β sialon | % other phases | | | |
| M | 3.238 | | 100 | | 137.5 (948.0) | 9.6 (66.2) | 29 |
| N | 3.238 | 10 | 90 | | 112.1 (772.9) | 9.0 (62.1) | 30 |
| O | 3.248 | 94 | 5 | 1 | 103.2 (711.6) | 12.3 (84.8) | 30 |
| P | 3.259 | 95 | | 5 | 90.3 (622.6) | 11.1 (76.5) | 30 |
| Q | 3.253 | 75 | 19 | 6 | 85.6 (590.2) | 13.5 (93.1) | 30 |
| R | 3.255 | 90 | 9 | 1 | 77.8 (536.4) | 6.8 (46.9) | 30 |
| S | 3.255 | 96 | 3 | 1 | 74.9 (516.4) | 9.1 (62.7) | 30 |
| T | 3.225 | 83 | 15 | 2 | 83.0 (572.3) | 9.9 (68.3) | 30 |
| U | 3.235 | 96 | 4 | | 82.3 (567.5) | 6.7 (46.2) | 30 |
| V | 3.232 | 98 | 1 | 1 | 81.1 (559.2) | 5.8 (40.0) | 30 |
| W | 3.343 | 85 | | 15 | 80.7 (556.4) | 8.2 (56.5) | 30 |

Note:
Oxygen contents of nitrides were determined from carrier gas fusion technique to yield true weight percents of each component in the composition. Oxygen associated with silicon nitride was assumed to be silicon dioxide and oxygen associated with aluminum nitride was assumed to be aluminum oxide.
*Rule of Mixtures density was determined from volume percentages of starting constituents and is useful only to give an indication of expected density after densification. It is not possible to calculate true theoretical density of final densified product since exact volume percentage and theoretical density of all resultant phases is not known. Optical microscopy of polished sections has revealed little or no porosity in all samples showing them to be greater than 94% dense. The
density assumed for silicon dioxide was that of quartz - 3.265 g/cc.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing a high density, high strength ceramic article, said process consisting essentially of:
    (a) forming a powder mixture consisting essentially of in percent by weight from about 48 to about 88 silicon nitride, from about 8 to about 30 aluminum nitride, from about 2 to about 16 of a first oxygen containing compound selected from the group consisting of yttrium, lithium, magnesium, calcium, scandium, rare earths, and combinations thereof, and from about 2 to about 12 of a second oxygen containing compounds of one or more metals as additives to aid densification;
    (b) forming a green article from said powder mixture; and
    (c) densifying said green article by sintering followed by hot isostatic pressing at an overpressure of nitrogen of up to about 29 kpsi, at a temperature of from about 1600° C. to about 2000° C. to form said high density, high strength ceramic article, wherein from about 70% to about 100% by weight of the crystalline phases are alpha sialon.

2. An process of claim 1 wherein said additives to aid in densification are oxygen containing compounds of metals selected from the group consisting of silicon, aluminum, titanium, zirconium, hafnium, vanadium, niobium, tantalum, yttrium, lithium, magnesium, calcium, scandium, rare earths, and combinations thereof.

* * * * *